Aug. 17, 1965    R. C. RAYNOR ETAL    3,200,956
CONTINUOUSLY OPERATING SEDIMENTATION TANKS
Original Filed March 5, 1961    5 Sheets-Sheet 1
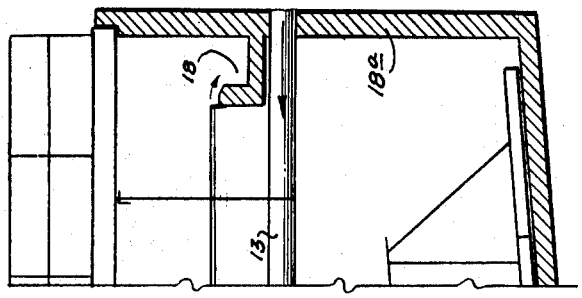
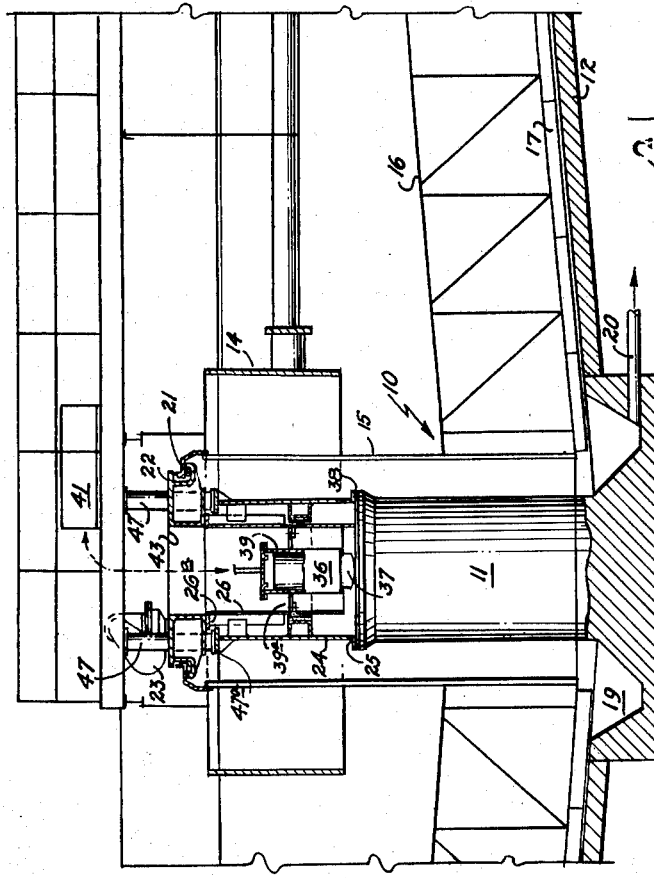
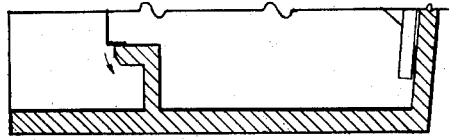
INVENTORS
RUSSELL C. RAYNOR
CHARLES H. SCOTT
BY
ATTORNEY

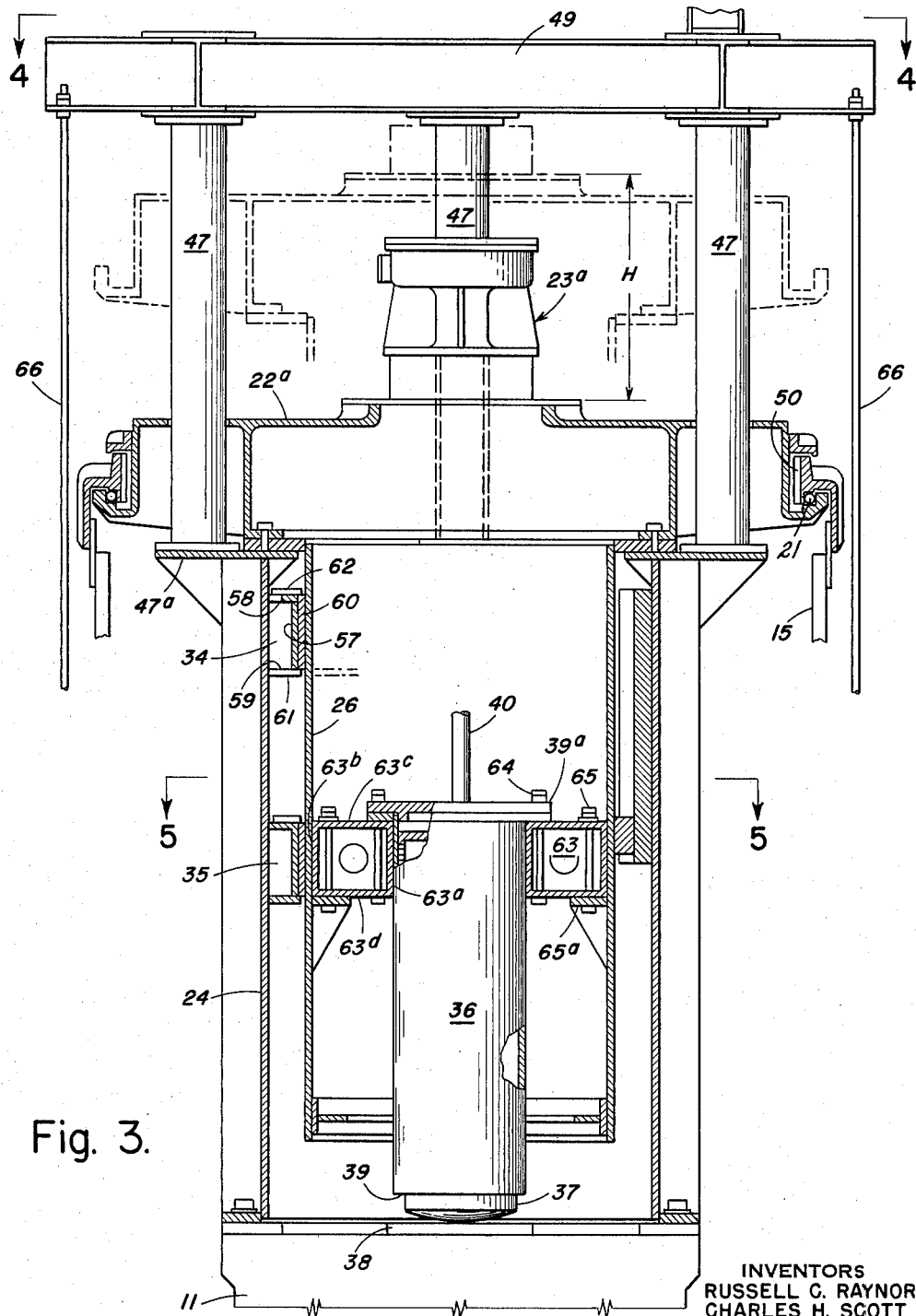

Aug. 17, 1965  R. C. RAYNOR ETAL  3,200,956
CONTINUOUSLY OPERATING SEDIMENTATION TANKS
Original Filed March 5, 1961  5 Sheets-Sheet 4

INVENTORS
RUSSELL C. RAYNOR
CHARLES H. SCOTT
BY *Theodore M. Jablon*
ATTORNEY

United States Patent Office 3,200,956
Patented Aug. 17, 1965

3,200,956
CONTINUOUSLY OPERATING SEDIMENTATION TANKS
Russell C. Raynor, South Salem, N.Y., and Charles H. Scott, South Norwalk, Conn., assignors to Dorr-Oliver Incorporated, Stamford, Conn., a corporation of Delaware
Continuation of application Ser. No. 95,853, Mar. 15, 1961. This application Dec. 22, 1964, Ser. No. 423,892
12 Claims. (Cl. 210—531)

This is a continuation of our application, Serial No. 95,853, filed March 15, 1961, and now abandoned.

This invention relates to continuously operating sedimentation tanks, and more particularly to improvements in the operation of the rotating sediment engaging means therein.

This invention is concerned with a sediment engaging or conveying structure mounted for rotation on a pier or the like that rises from the bottom of the tank, as distinct from those arrangements where the sediment engaging means or rake structure is supported for rotation depending from an overhead construction spanning the entire tank.

Usually, in the pier-supported type of rake structure herein contemplated and suited for tanks of relatively large diameters, that structure comprises a central vertical portion or cage that surrounds the pier, having sediment engaging rake arms or the like extending horizontally or radially from the cage. This rake structure is rotatable about a vertical axis with the upper end of the cage operating upon an annular vertical thrust bearing means provided on a horizontal supporting frame or turntable base which is mounted and supported on the pier. Preferably, a self-contained or motorized drive unit carried by the turntable base effects rotation of the rake structure about the vertical axis of the pier. Also, usually a radially extending truss construction or a walkway structure is provided between the tank wall and the pier, whereby access may be had to the mechanism on the pier.

This invention is concerned with providing improved drive and lifting means for a pier-supported rake structure, which is of great simplicity and ruggedness, while enabling the rake structure as a whole to be bodily raised or lowered without binding, when sludge load accumulations on the bottom are to be overcome, or to enable the rake structure to be operated at different levels relative to the bottom of the tank.

To this end, the invention provides an arrangement wherein the rake structure and the turntable base constitute an assembly which is axially moveable as a whole relative to the supporting pier.

Preferably, the invention is embodied in an arrangement wherein a vertically moveable horizontal supporting frame or turntable base has a depending guide portion substantially concentric and cooperating with an upright stationary guide member having its bottom end fixedly connected to the tank bottom or to the pier. Vertical guide track means are provided on one of the concentric guide members, cooperating with corresponding torque portions provided on the other guide member.

In a preferred embodiment, the track means are in the form of a triple track arrangement so constructed with the tracks substantially equally spaced from one another about the axis of rotation. In this way, the torque reaction force resulting from the drive unit imparting rotation to the rake structure is equally distributed to all the tracks, so that binding during the movement of the axially moveable assembly is avoided. Additional guide bearing means for the depending guide means and for the depending guide member provide axial guidance and stability for the rake structure in conjunction with the operation of the tracks, even when the rake structure is rotated against a load.

Some features of this invention are concerned with various forms of vertical guide arrangements.

Other features are concerned with various arrangements of actuating means or mechanism for raising and lowering the vertically moveable assembly.

A specific feature lies in the provision of a set of specially arranged stationary column members for supporting upwardly spaced platform means.

Other features and advantages will hereinafter appear.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

FIG. 1 is semi-diagrammatic vertical sectional view of a sedimentation apparatus illustrating one embodiment of the improved drive and rake lifting arrangement along with a specially arranged pier-supported platform means, and also illustrating one form of lifting means for the turntable base, effective directly between the pier and the base;

FIG. 2 is a more diagrammatic total view of the sedimentation apparatus of FIG. 1, illustrating the vertical lifting movement of the rake structure;

FIG. 3 is a greatly enlarged slightly modified structural detail view of the drive and rake lifting arrangement shown in FIG. 1;

Figure 4:
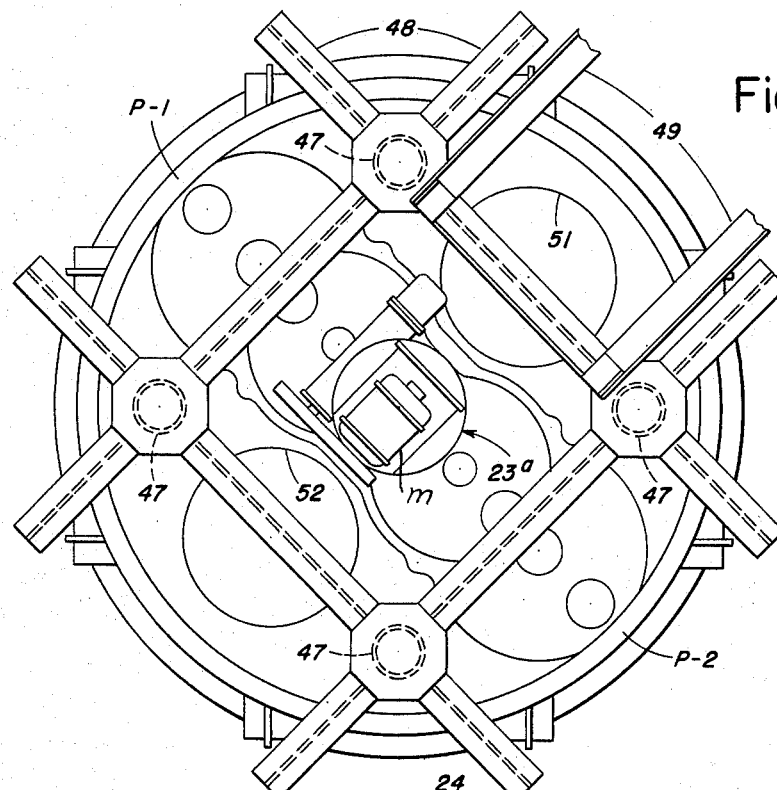
FIG. 4 is a top plan view taken on line 4—4 of the construction shown in FIG. 3, illustrating the platform structure.

The sedimentation apparatus embodying the invention according to the example shown in FIGS. 1, 2, and 3, comprises a conventional rake structure 10 mounted for rotation upon a pier 11 that rises centrally from the bottom 12 of a cylindrical settling tank. A feed suspension to be clarified or a slurry to be thickened enters the tank through a horizontal feed pipe 13 leading into a cylindrical feedwell 14 that surrounds the central portion or cage 15 of the rake structure which has a set of rake arms 16 as shown in the form of a truss construction radially extending from and rigidly connected to the cage, and carrying the usual sediment engaging blades 17. In the continuous sedimentation operation, clarified liquid passes into an effluent launder 18 arranged peripherally along the cylindrical wall 18a of the tank, while the blades on the raking structure move the sediment or sludge over the tank bottom to an annular collecting sump 19 surrounding the foot end of the pier, from thereto be withdrawn or pumped away as underflow through a discharge conduit 20 leading from this sump.

An annular vertical thrust bearing 21 supports the rake structure for rotation upon a horizontal supporting frame or turntable base 22 which is also carries a self-contained drive unit for rotating the rake structure upon this base. In FIGS. 1 and 2 such a drive unit 23 is located off center, while in FIG. 3 drive unit 23a is shown arranged on center.

According to the invention, the combined drive and lifting means for the rake structure comprise a pair of telescoping guide members effective between the turntable base and the pier, with vertical guide means enabling telescoping movement of the guide members, while preventing rotational displacement of the guide members relative to each other. In a preferred embodiment, a vertical triple track arrangement is effective between these guide members, arranged to operate in such a manner that the torque reaction force resulting from the drive unit 23 or 23a imparting rotation to the rake structure is equally distributed to all the tracks, so that the telescoping guide members may be shifted relative to each other without binding even with the rake structure rotating against a load while being lifted.

Accordingly, in the embodiment of FIGS. 1 to 3, an upright cylindrical guide member 24 has its lower end 25 fixedly connected to the base portion of the tank or top end of the pier, surrounding a depending cylindrical guide member 26 the upper end 26a of which is fixedly connected to the underside of the turntable base, so that in its lower-most position the turntable base may rest upon the top end of the stationary guide member 24.

Three vertical track members 28, 29, and 30 (see FIG. 5) are fixed internally upon the upright guide member 24 facing inwardly towards the depending member, which track members are spaced substantially equally from one another about the axis of rotation of the rake structure. These track members cooperate with similarly spaced torque portions 31, 32, and 33 fixed externally upon the depending guide member 26. In this way, in the operation of the rake structure, the triple track arrangement performs the dual function of a vertical guide and of a torque resisting means. Additionally, there are provided (see FIG. 3) an upper radial guide bearing means 34, as well as a lower radial guide bearing means 35, to provide axial stability in the lifting movement of the rake structure, in conjunction with the operation of the tracks. Each of these guide bearing means may be in the form of sector members as illustrated in FIG. 3 arranged in alternation with the tracks, the upper sector members being designated (see FIG. 5) by numerals 34a, 34b, and 34c respectively. From the enlarged detail shown in FIG. 3 it will be understood that the upper set 34 of the guide sector members provides stability when the rake structure is in a low position, while the lower set 35 provides stability when the rake structure is in a raised position.

Although a variety of lifting means may be employed for effecting the axial movement of the turntable base 22a together with the rake structure, the embodiment of FIGS. 1 to 3 employs a vertically disposed hydraulic power cylinder unit 36 effective directly between the depending guide member 26 and the top end of the pier. As exemplified, the hydraulic unit comprises a piston or ram 37 engaging a thrust plate 38 or the like fixed to the top end of the pier, and an inverted cylinder member 39 wherein the piston operates, which cylinder has a fixed connection 39a (see FIG. 1) with the surrounding depending guide member 26. A flexible pressure fluid line 40 connects the power cylinder with a pump or supply unit 41 supported upon platform means above. When pressure is applied to the top of piston 37 through the flexible fluid line 40, the piston cannot move downwardly by virtue of the end being against the thrust plate 38 which is fixed to the top of the pier 11 which is stationary. However, the pressure reaction will take place against the cylinder 36 and will cause the cylinder to raise on the piston. The cylinder being fixedly connected to the guide member 26 will move the turntable base upwardly as shown in the dotted lines in FIG. 3 also carrying with it the drive mechanism, the bull gear cage and the rake structure. The convexly shaped lower end of the piston member 37 engaging the face of the thrust plate on the pier allows for self adjustment of the cylinder unit incident to the telescoping movement of the guide members when raising or lowering the turntable base.

In the embodiment of FIG. 1, with the drive unit 23 for the rake structure eccentrically disposed, the turntable base has an unobstructed central manhole opening 43 providing access into the interior of the depending guide member and thus to the power cylinder unit located therein.

The invention also provides a pier-supported platform structure spaced upwardly from the turntable base by means of a set of rigid column members 47 preferably connected to annular bracket means 47a at the top end of the upright member 24, and extending through the vertically moveable turntable base. Headroom is thus provided to the extent of accommodating the axial lifting movement of the turntable base as between the platform structure and the pier.

In FIG. 3, a set of four column members 47 supports a platform structure indicated by a steel frame 48. A pair of horizontal steel beams 49 indicate the provision of the radial connection of walkway between this platform and the wall of the tank. FIG. 3 also illustrates a motorized drive mechanism 23a for the rake structures on turntable base 22a as an example wherein the floating arrangement of a motor M applies a balanced drive torque to an internal bull gear 50 on the rake structure at diametrically opposed points P–1 and P–2 thereof (see FIG. 4), such an example being shown and described in the patent to Scott No. 2,086,394.

Manhole openings 51 and 52 are provided on respective sides of this drive mechanism 23a for access into the interior of depending guide member 26 and thus to the hydraulic power cylinder unit located therein.

Figure 5:
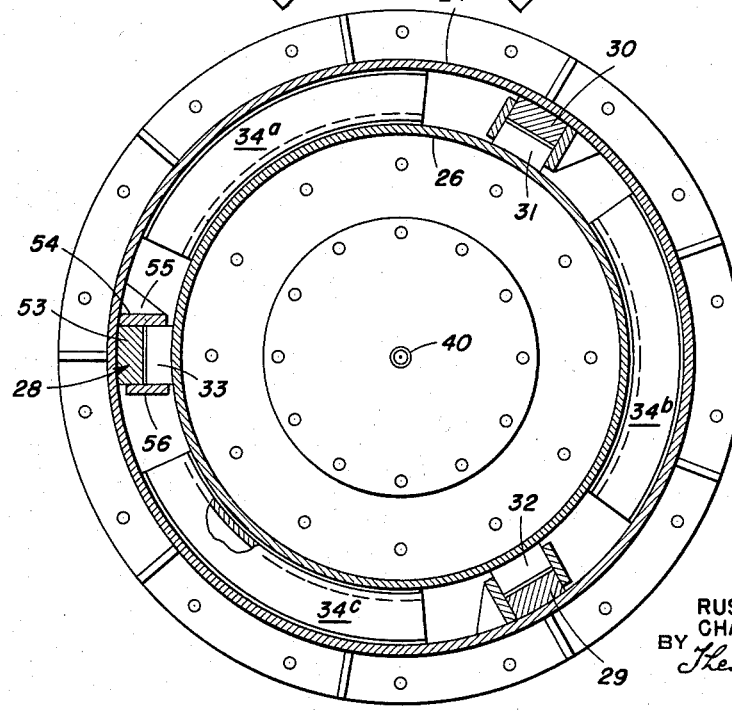
FIG. 5 is a cross-sectional view taken on line 5—5 of FIG. 3, illustrating the triple track arrangement.

From the enlarged detail, FIG. 5, it will be seen that the vertical guide tracks are U-shaped in cross-section so torque portions or torque lugs of the depending guide member may operate. The tracks as herein exemplified are of a composite construction having an intermediate vertical track portion 53 to which is permanently fixed or welded a lateral track portion 54 which in turn has reinforcing ribs 55 connecting it as by welding to the stationary guide member 24 for absorbing the torque reaction forces resulting when rotation is imparted to the rake structure. The torque portions or lugs are loosely confined between this fixed lateral track portion 54 and a detachable lateral track portion 56 bolted to the intermediate track portion 53.

Also, in more detail, the aforementioned sector members constituting the additional guide bearing means between the telescoping guide members 24 and 26, comprise (see FIG. 3) each a curved channel U-shaped in cross section. This channel member has a curved intermediate vertical portion 57 and horizontal side portions 58 and 59 fixed or welded to the inner face of the stationary guide member 24. A correspondingly curved bearing liner 60 is held in place upon the concavely curved inner face of the channel member by means of an inwardly extending projecting edge portion or fixed ledge 61 protruding from the channel member, and a removable retaining member 62 bolted to the top face of the channel member.

With respect to the mounting of the hydraulic power cylinder unit in this embodiment, there is shown a hollow annular thrust transmitting member 63 having inner and outer cylindrical faces 63a and 63b respectively, and flat top and bottom faces 63c and 63d respectively. This annular member 63 closely surrounds the upper end of the power cylinder and is rigidly connected thereto as indicated by the bolt connection 64. This ring member fits into the depending guide member 26 to which it is rigidly connected as by means of bolt connections 65 fastening this ring member to brackets 65a which are fixedly connected or welded to the inner face of the depending guide member 26. The extent of the axial movement of the turntable base is indicated by the distance H.

A set of suspension rods 66 depending from the platform structure 49 indicate the means whereby a cover structure for the tank may be supported on the pier through column members 47 and outer guide member 26.

Figure 6:
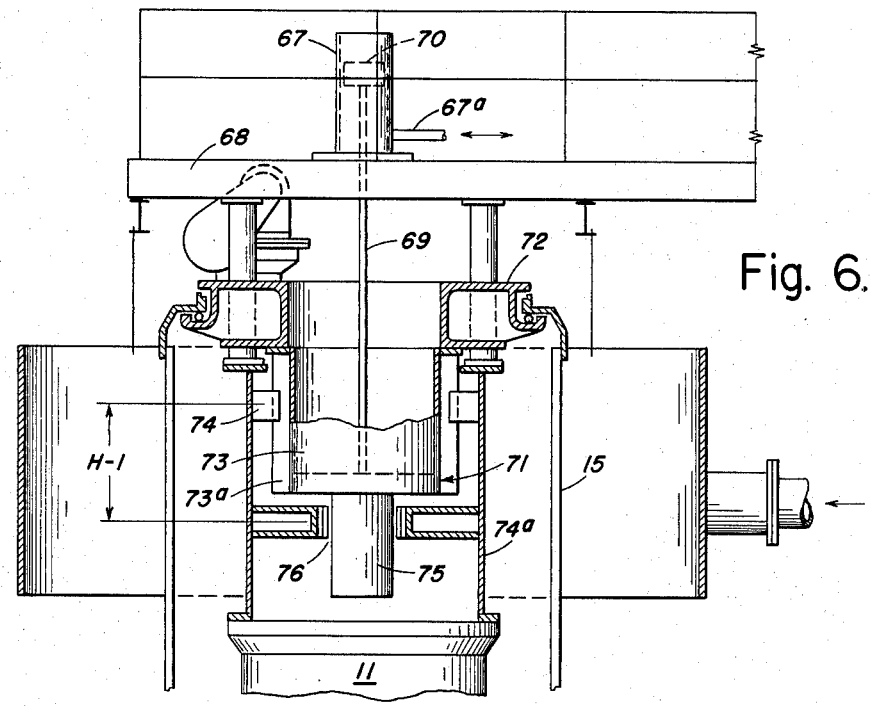
FIG. 6 is a semi-diagrammatic vertical sectional view of a modified drive and rake lifting arrangement, featuring a lifting mechanism supported on the platform means above the turntable base.

The embodiment in FIG. 6 differs from that in FIGS. 1 to 3, in that a vertical hydraulic power cylinder unit 67 with pressure fluid supply connection 67a for lifting and lowering the turntable base with the rake structure is located upon a platform 68 supported by column members similar to column member 47 previously described, and with a suspension member 69 connecting the piston 70 of the power unit with the vertically moveable assembly. Another difference lies in the arrangement of the telescoping guide members as well as in the manner in which telescoping movement thereof is stabilized.

Accordingly, a depending guide member 71 is fixedly attached to the underside of a turntable base 72 which is similar to the one shown in FIG. 1. The depending guide member is particularly shaped in that it has a wide upper cylindrical portion 73 carrying three vertical tracks 73a cooperative with stationary torque lugs 74 provided on the surrounding stationary guide member 74a, and that it has a reduced lower cylindrical end portion 75 cooperative with a stationary guide bearing 76. This triple track arrangement thus differing structurally in some respects from the one in FIGS. 1 to 3, is functionally similar in that equal shares of the torque reaction force are absorbed by the three torque lugs operating on the tracks. In this arrangement, the distance H–1 between the torque lugs 74 and the guide bearing 76 defines a constant axial length along which the vertically moveable assembly is guided during the raising or lowering of the turntable base.

Figure 7:
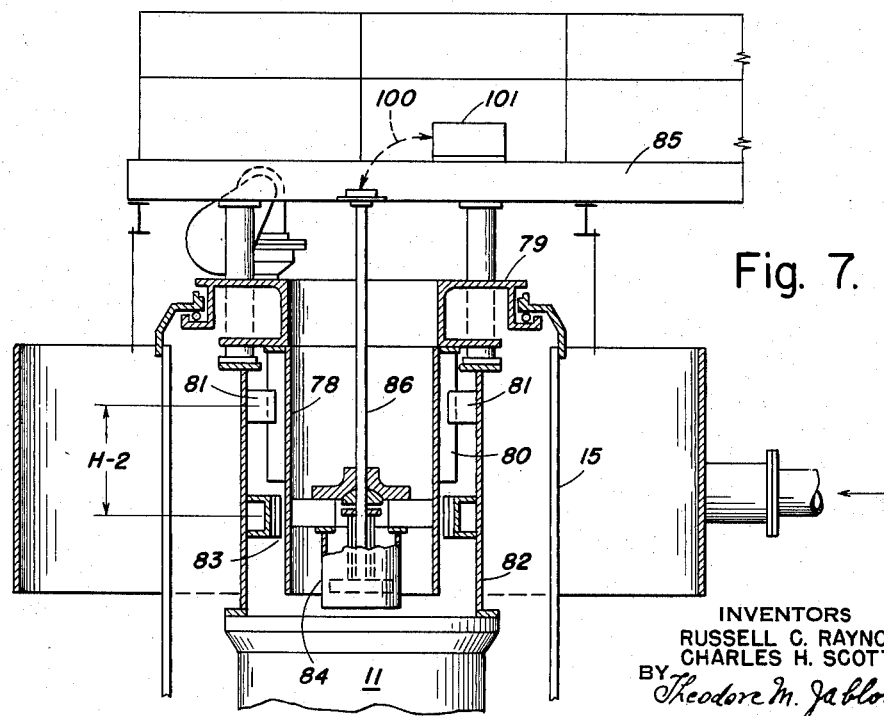
FIG. 7 is a semi-diagrammatic vertical sectional view of still another form of the invention, illustrating the drive and rake lifting arrangement with the lifting mechanism deriving support from the platform means above the turntable base.

In the embodiment of FIG. 7, the vertical guide arrangement for the moveable assembly resembles that of FIG. 6, in that a depending cylindrical guide member 78 is fastened to the underside of a turntable base 79 which latter is similar to the one in FIG. 6. Along its upper portion this cylindrical hollow guide member has fixed thereto a triple track arrangement 80 similar to the one in FIG. 6, cooperating with equally similar torque lugs 81 located at the upper end of the surrounding stationary guide member 82 which latter also carries the additional guide bearing 83 cooperating with the lower end portion of the depending member 78.

Again, as in FIG. 6, there is a fixed axial distance H–2 between the torque lugs 81 and the guide bearing 83 defining the axial guided length of the vertically moveable assembly.

Figure 8:
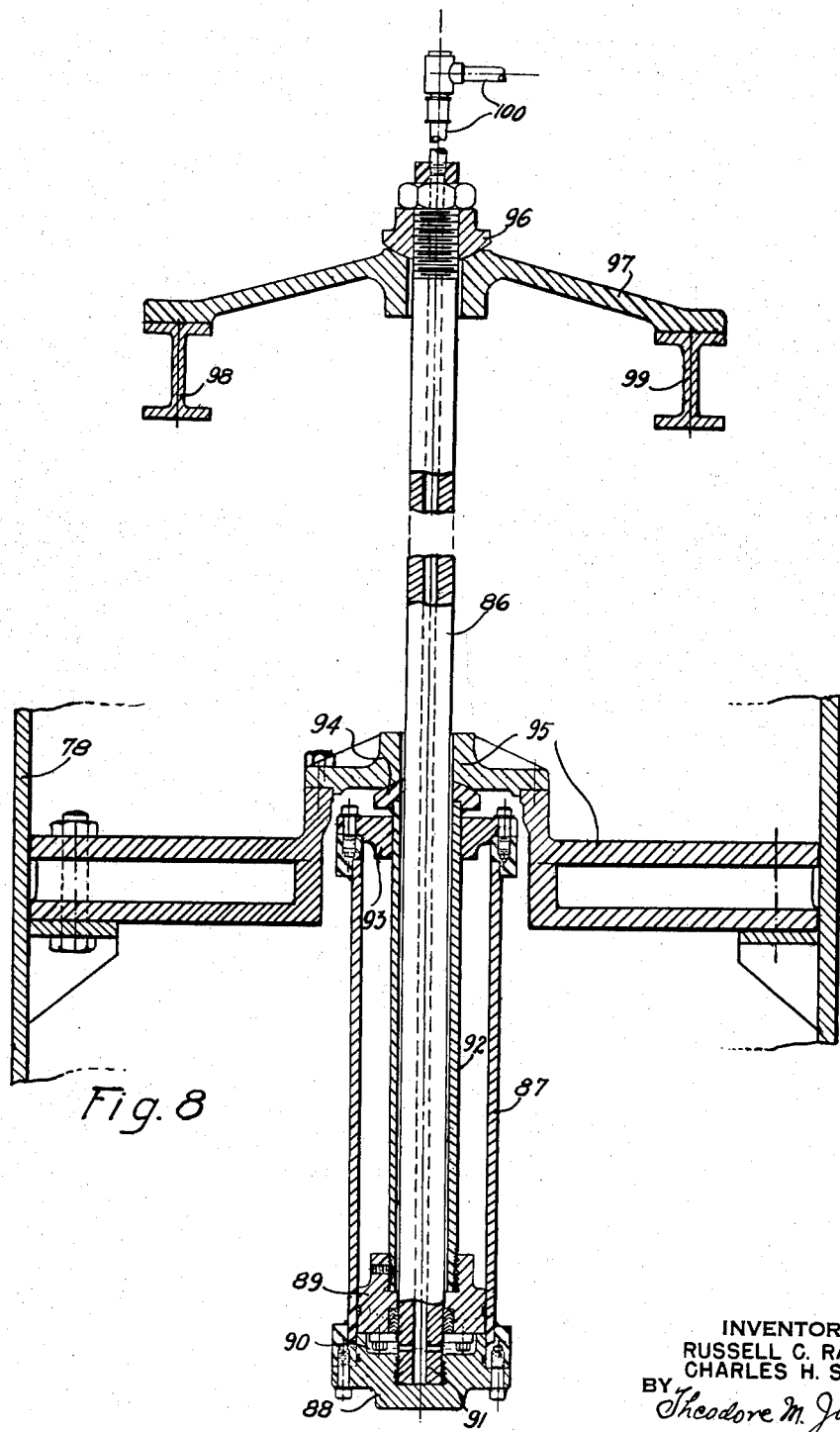
FIG. 8 is a greatly enlarged vertical sectional view of the special hydraulic power lifting unit indicated in the embodiment of FIG. 7.

However, the embodiment in FIG. 7 differs from that in FIG. 6 by a different arrangement of a hydraulic power unit 84 whereby the turntable base with rake structure may be raised or lowered. This actuating unit is mounted within the vertically moveable assembly although supported from a platform 85 through a tubular suspension member 86 which latter also serves as a supply conduit for introducing pressure fluid from a supply unit 101 into the cylinder of the power unit, the function of which is explained as follows by reference to the detail, FIG. 8.

In that instance (see FIG. 8) the actuating unit 84 comprises the aforementioned suspension member 86 which is co-axial with a vertical hydraulic cylinder 87, and has its lower end portion fixed to a closure member 88 constituting the bottom of the cylinder. An annular piston member 89 surrounds the centrally disposed suspension member 86, so that the piston member together with the surrounding cylinder walls and with the bottom closure member constitutes the effective annular pressure chamber 90 into which pressure fluid may be forced through the hollow suspension member 86 and through radial emitting passages 91 provided in the lower end portion of the suspension member. With pressure fluid thus supplied to the power cylinder, the piston member will exert upward thrust upon a tubular element 92 surrounding the suspension member and extending upwardly slideably through a top closure member 93 of the cylinder, thus imparting upward thrust to a spherical bearing member 94 engaging a part 95 connected rigidly although detachably to the depending guide member 78 and thus transmitting the upward thrust to the turntable base which may be guided vertically in the manner set forth above.

Anchoring means for the top end of the suspension member 86 comprises another spherical bearing member 96 complementary to the lower spherical bearing member 94, with an anchoring plate 97 supporting the spherical bearing member on platform structure 85 indicated by beam members 98 and 99. A pressure fluid line 100 is indicated to provide the connection between the hollow suspension member or conduit 86 and a pump or pressure fluid supply unit 101 shown shown to be mounted on the platform 85.

From the foregoing it will be seen that the invention provides improvements in sedimentation apparatus, whereby the assembly including the rake structure and the turntable base, is bodily axially moveable although with the turntable secured against rotation. Vertical guide means preferably include a triple track arrangement cooperating with additional guide bearing means arranged to provide axial stability together with a track arrangement, whereby the invention provides a combined drive and lifting mechanism of great simplicity, compactness and accessibility, as well as highly effective operation in transmitting torque. In connection with this axially moveable assembly, the invention also features platform supporting members extending vertically through the axially moveable turntable base.

Furthermore, while the invention has been illustrated and described as embodied in a construction wherein the depending guide member is surrounded by the upright stationary guide member, and the vertical guide means between them comprise a vertical triple track arrangement cooperating, as well as additional guide bearing means, it is not limited to the details shown, since various modifications and structural changes may be made without departing from the spirit of this invention.

For example, the relationship of the telescoping guide members may be reversed from the ones herewith illustrated, and the guide tracks may be differently constructed and arranged with respect to location as well as with respect to number of tracks, although a self-balancing-triple track arrangement is preferred.

In another embodiment, the additional guide bearing means cooperating with the track arrangement may be made unitary with the hydraulic actuating unit for raising and lowering the assembly. Such an arrangement can be visualized by utilizing some of the structural features shown in FIG. 6. That is, if the separate hydraulic actuating unit 67 and the guide bearing 76 are eliminated, the reduced end portion 75 of the depending guide member can be employed to perform the function of a piston or ram operating in a hydraulic cylinder the closed bottom end of which is fixed to and braced against the pier, with this cylinder thus serving in lieu of the guide bearing means 76.

Furthermore, while the vertical guide bearing means may comprise a plurality of two or more vertical guide tracks, a preferred embodiment provides a set of three tracks cooperating with respective torque portions or lugs spaced substantially 120° apart.

For example, referring to the enlarged detail of FIG. 3, there may be provided, say, only one pair of vertical guide tracks opposite each other, combined with an upper and a lower set of sector shaped horizontal guide bearing members of about semi-circular extent arranged between or alternating with the vertical guide tracks which in turn cooperate with a corresponding pair of torque portions or lugs.

We claim:

1. In a sedimentation apparatus having a settling tank, said settling tank having a stationary base portion the combination which comprises a rotary sediment engaging structure rotatable about a vertical axis and provided with a central vertical cage portion, a toothed bull gear fixed to said cage portion concentric with the axis of rotation of said sediment engaging structure, a turntable base supported on said base portion for vertical movement thereon, vertical guide means secured to said turntable base, annular thrust bearing means mounted on said turntable base and supporting said cage portion and bull gear for rotation on said turntable base, gear means on said turntable base in driving engagement with said bull gear for rotating said cage and sediment engaging structure relative to said turntable base, a fixed upright guide structure supported on said base portion within the area surrounded by said cage portion and having means cooperating with the guide means on said turntable base for vertically guiding said turntable base while securing the same against rotation, actuating means raising or lowering said turntable base together with said thrust bearing means, said bull gear, said gear means, said cage portion, and sediment engaging structure, and means for imparting driving power to said gear means for rotating said sediment engaging structure on said turntable base.

2. The apparatus according to claim 1, wherein the cooperating means of said fixed upright guide structure comprises at least three vertical parallel track members spaced substantially evenly about the axis of rotation of the sediment engaging structure, and wherein said guide means on the turntable base is complementary to and engages the respective track members.

3. The apparatus according to claim 1, wherein said driving power means for said gear means are mounted on and carried by said turntable base.

4. The apparatus according to claim 1, wherein said upright guide structure comprises a cylindrical member, said cooperating means comprising a plurality of vertical parallel track members spaced substantially evenly about the vertical axis of rotation of said sediment engaging structure and fixed to said cylindrical member, and wherein said guide means on the turntable base is complementary to and engages the respective track members.

5. The apparatus according to claim 1, wherein said bull gear is of open center construction, and a fixed support structure is provided and supported on said base portion, which support structure extends vertically upwards through said turntable base and through the open center of said bull gear member.

6. The apparatus according to claim 1, wherein said bull gear is of open center construction and a fixed support structure is provided and supported on said base portion, which support structure extends upwardly through said turntable base and through the open center of said bull gear member, and wherein said actuating means are supported on said fixed support structure.

7. The invention according to claim 1 in which the guide means on the turntable extends downwardly from said turntable base.

8. The invention according to claim 1 in which said guide means on the turntable and said fixed guide structure comprise respectively cylindrical members concentric with each other and said axis, said cooperating means comprising at least three vertical guide members spaced evenly about said axis and mounted on one of the cylindrical members, and at least three guide members mounted on the other of said cylindrical members each of the vertical guide members cooperating respectively with one of the guide members on said one of the cylindrical members.

9. The apparatus according to claim 1 wherein there is provided a radial bearing located between said guide means and said guide structure effective to prevent relative radial movement of said guide means with respect to said guide structure.

10. The apparatus according to claim 1 wherein the guide means on the turntable and the said fixed guide structure comprise respectively cylindrical members concentric with each other and said axis, said guide means and said guide structure having telescoping relationship to each other when the turntable base is raised and lowered, said cooperating means being provided on the respective cylindrical members.

11. In a sedimentation apparatus having a settling tank, said settling tank having a base portion, the combination which comprises a rotary sediment engaging structure provided with a central vertical cage portion open at the top, an internally toothed bull gear member fixed to the top end of said cage portion concentric with the axis of rotation of said sediment engaging structure and constituting an inwardly directed annular overhang, a turntable base supported on said base portion having annular thrust bearing means upon which said overhanging bull gear member is supported for rotation, a guide means on said turntable base, gear means mounted on said turntable base in driving engagement with said internal bull gear member for rotating said sediment engaging structure relative to said turntable base, a fixed upright guide structure means supported on said base portion within the area surrounded by said cage portion and having means cooperating with the guide means on said turntable base for vertically guiding said turntable base while securing the same against rotation when raising or lowering said turntable base, actuating means for raising and lowering said turntable base together with said thrust bearing means, said bull gear, said gear means, said cage portion, and sediment engaging structure, and means for imparting driving power to said gear means for rotating said sediment engaging structure on said turntable base.

12. In sedimentation apparatus having a settling tank, said settling tank having a base portion, the combination which comprises a rotary sediment engaging structure provided with a central vertical cage portion open at the top, an internally toothed bull gear member fixed to the top end of said cage portion concentric with the axis of rotation of said sediment engaging structure and constituting an inwardly directed annular overhang, a turntable base supported on said base portion and having annular thrust bearing means upon which said overhanging bull gear member is supported for rotation, gear means mounted on said turntable base in driving engagement with said internal bull gear member for rotating said sediment engaging structure relative to said turntable base, a depending guide structure extending downwardly from said turntable base, a fixed upright guide structure supported on said base portion within the area surrounded by said cage portion, cooperating means on said upright guide structure and said depending guide structure for vertically guiding said turntable base while securing the same against rotation when raising or lowering said turntable base, actuating means for raising and lowering said turntable base together with said thrust bearing means, said bull gear, said gear means, said cage portion and said sediment engaging structure, and means for imparting driving power to said gear means for rotating said sediment engaging structure on said turntable base.

References Cited by the Examiner

UNITED STATES PATENTS

| | | | |
|---|---|---|---|
| 2,086,394 | 7/37 | Scott | 210—528 |
| 2,360,817 | 10/44 | Scott | 210—531 |
| 2,585,006 | 2/52 | Graner et al. | 210—531 X |
| 2,723,760 | 11/55 | Talbot | 210—530 |
| 2,837,215 | 6/58 | Chelminski | 210—531 |
| 3,002,400 | 10/61 | Scott | 210—531 X |

FOREIGN PATENTS 635,573  4/50  Great Britain.

REUBEN FRIEDMAN, *Primary Examiner.*